United States Patent
Kim (10) Patent No.: US 8,904,157 B2
(45) Date of Patent: Dec. 2, 2014

(54) COMPUTER, REMOTE CONTROL SYSTEM, CONTROL METHOD OF COMPUTER AND REMOTE CONTROL METHOD

(75) Inventor: Su-yong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 956 days.

(21) Appl. No.: 11/753,842

(22) Filed: May 25, 2007

(65) Prior Publication Data

US 2008/0059819 A1    Mar. 6, 2008

(30) Foreign Application Priority Data

Sep. 6, 2006  (KR) .......................... 10-2006-0085793

(51) Int. Cl.
*G06F 1/32* (2006.01)
*G06F 1/26* (2006.01)
*G06F 15/177* (2006.01)
*H04L 12/12* (2006.01)

(52) U.S. Cl.
CPC .................. *G06F 1/325* (2013.01); *Y02B 60/32* (2013.01); *Y02B 60/34* (2013.01); *G06F 1/3209* (2013.01); *H04L 12/12* (2013.01)
USPC .................... 713/1; 713/2; 713/300; 713/310; 713/320; 713/324; 709/201; 709/203; 709/220; 709/221; 709/222

(58) Field of Classification Search
CPC ............. G06F 1/18; G06F 1/189; G06F 1/24; G06F 1/26; G06F 1/263; G06F 1/266; G06F 1/32; G06F 1/3203; G06F 1/3209; G06F 1/3215; G06F 1/325; G06F 3/0625; G06F 3/1221; G06F 15/177; G06F 13/10
USPC ......... 713/300, 310, 320–324, 330, 340, 1, 2, 713/100; 709/201, 203, 220, 221, 222
See application file for complete search history.

(56) References Cited

U.S. PATENT DOCUMENTS 4,747,041 A * 5/1988 Engel et al. ................... 713/324
6,317,839 B1  11/2001 Wells
(Continued)

FOREIGN PATENT DOCUMENTS

CN  1261697 A  8/2000
CN  1505777 A  6/2004
(Continued)

*Primary Examiner* — Fahmida Rahman
(74) *Attorney, Agent, or Firm* — Jefferson IP Law, LLP (57) ABSTRACT

A computer including a main body in which a system is built, a peripheral device coupled to the main body, a power supplying part to supply power to the system and/or the peripheral device, an interface part to communicate with an external device, and a controller to control the power supplying part to apply power to the system but not to the peripheral device if a power-saving power applying signal is received through the interface part.

21 Claims, 4 Drawing Sheets

(56) References Cited

U.S. PATENT DOCUMENTS

| | | | |
|---|---|---|---|
| 6,411,691 B1 * | 6/2002 | Pasdeloup et al. | 379/102.04 |
| 6,495,979 B2 | 12/2002 | Park et al. | |
| 6,591,368 B1 * | 7/2003 | Ryu | 713/323 |
| 6,760,850 B1 * | 7/2004 | Atkinson et al. | 713/320 |
| 6,766,223 B1 * | 7/2004 | Motoyama | 700/286 |
| 7,099,934 B1 * | 8/2006 | Ewing et al. | 709/223 |
| 7,380,142 B2 | 5/2008 | Lee et al. | |
| 7,461,278 B2 * | 12/2008 | Togawa | 713/320 |
| 7,620,829 B2 | 11/2009 | One | |
| 7,650,519 B1 * | 1/2010 | Hobbs et al. | 713/300 |
| 7,702,771 B2 * | 4/2010 | Ewing et al. | 709/223 |
| 2005/0198245 A1 * | 9/2005 | Burgess et al. | 709/223 |
| 2005/0204176 A1 | 9/2005 | Togawa | |

FOREIGN PATENT DOCUMENTS

| | | |
|---|---|---|
| CN | 1746818 A | 3/2006 |
| JP | 11-296410 | 10/1999 |
| JP | 2002-55891 | 2/2002 |
| KR | 2002-87184 | 11/2002 |
| KR | 2003-76098 | 9/2003 |
| KR | 2004-92248 | 11/2004 |
| KR | 10-0526703 A | 10/2005 |
| KR | 10-2006-0021758 A | 3/2006 |
| KR | 10-2006-0042781 A | 5/2006 |

* cited by examiner

COMPUTER, REMOTE CONTROL SYSTEM, CONTROL METHOD OF COMPUTER AND REMOTE CONTROL METHOD

CROSS-REFERENCE TO RELATED APPLICATION

This application claims the benefit of Korean Application No. 2006-85793, filed Sep. 6, 2006 in the Korean Intellectual Property Office, the disclosure of which is incorporated herein by reference.

BACKGROUND OF THE INVENTION

1. Field of the Invention

Aspects of the present invention relate to a computer, a remote control system, a control method of a computer and a remote control method, and, more particularly, to a computer, a remote control system, a control method of a computer, and a remote control method capable of being managed and connected with a host computer through a network.

2. Description of the Related Art

In general, a network connects plural computers physically, and may be classified into a Local Area Network (LAN), a Metropolitan Area Network (MAN), and a Wide Area Network (WAN) according to their spatial distance. A conventional remote control system has a manager's personal computer (PC) or server as a control system with plural systems to be managed through a network to which the PC is connected. Operations such as a power cycle, a system asset management, a system tool management (or instrument), a system update, and a cure of a problem using an Alert Standard Format (ASF) or an Intel® Active Management Technology (AMT™) are then conducted through the manager's PC.

In the remote control system using the conventional network, the host computer controls and monitors client computers provided as plural computers at a remote distance. For this purpose, the host computer controls input/output devices of plural client computers to perform a plurality of application programs respectively performed in the plural client computers in the host computer and to make client computers act as terminals by supplying the performed results to the client computers. At this time, the host computer monitors the client computers using peripheral devices of the host computer while operating the systems of the client computers.

However, in the conventional remote control system, where the host computer transmits a remote power applying command so as to monitor the client computers, the concerned client computer performs a general booting operation in response. At this time, power is unnecessarily applied to peripheral devices of the client computers.

SUMMARY OF THE INVENTION

It is therefore an aspect of the invention to provide a computer, a remote control system, a control method of computer, and a remote control method capable of preventing power from being wasted unnecessarily by applying power only to a system necessary for a booting operation without applying power to peripheral devices when a host computer applies a power-saving power to a client computer in a remote control system.

The foregoing and/or other aspects of the present invention may be achieved by providing a computer including a main body in which a system is built, a peripheral device coupled to the main body, a power supplying part to supply power to the system and/or the peripheral device, an interface part to communicate with an external device, and a controller to control the power supplying part to apply power to the system but not to the peripheral device if a power-saving power applying signal is received through the interface part.

According to the exemplary embodiment of the present invention, the power supplying part comprises a switching part connecting a path through which power is applied to the peripheral devices; and the controller controls the switching part to block the power applied to the peripheral devices from the power supplying part if the power-saving applying signal is received through the interface part.

According to the exemplary embodiment of the present invention, the switching part comprises at least a switch corresponding to the peripheral devices.

According to the exemplary embodiment of the present invention, the controller controls the switch corresponding to the peripheral devices to block the power applied to the selected peripheral devices if the power-saving applying signal is received through the interface part.

The foregoing and/or other aspects of the present invention may be achieved by providing a remote control system, comprising: a client computer to apply power only to a system therein without applying power to a peripheral device coupled thereto if a power-saving applying signal is received by the client computer; and a host computer, connected with the client computer through a network, to transmit the power-saving applying signal to the client computer.

According to the exemplary embodiment of the present invention, the host computer transmits selection information selecting the peripheral device not to apply power and the power-saving applying signal to the client computer, and the client computer blocks the power applied to the peripheral device corresponding to the selection information when power is applied if the power-saving applying signal is inputted.

The foregoing and/or other aspects of the present invention may be achieved by providing a method of controlling a computer including a main body and a peripheral device, comprising: determining whether a power applying signal for applying power to the main body and the peripheral device is a power-saving applying signal; and blocking power from being applied to the peripheral device when the power applying signal is determined to be the power-saving applying signal.

According to the exemplary embodiment of the present invention, the determining of the power-saving applying signal comprises determining selection information with respect to the peripheral device selected to block the power supply; and blocking the power applied to the peripheral device selected according to the selection information.

The foregoing and/or other aspects of the present invention can be achieved by providing a method of remotely controlling a client computer via a host computer, comprising: transmitting either a power applying signal or a power-saving applying signal to the client computer from the host computer; and blocking power from being applied to a peripheral device of the client computer when the power-saving applying signal is transmitted to the client computer.

According to the exemplary embodiment of the present invention, the remote control method further comprises: generating selection information to select the peripheral device to be blocked from the power supply when the host computer applies the power to the client computer; and blocking the power applied to the peripheral device selected according to the selection information when power is applied if the client computer receives the power-saving applying signal.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
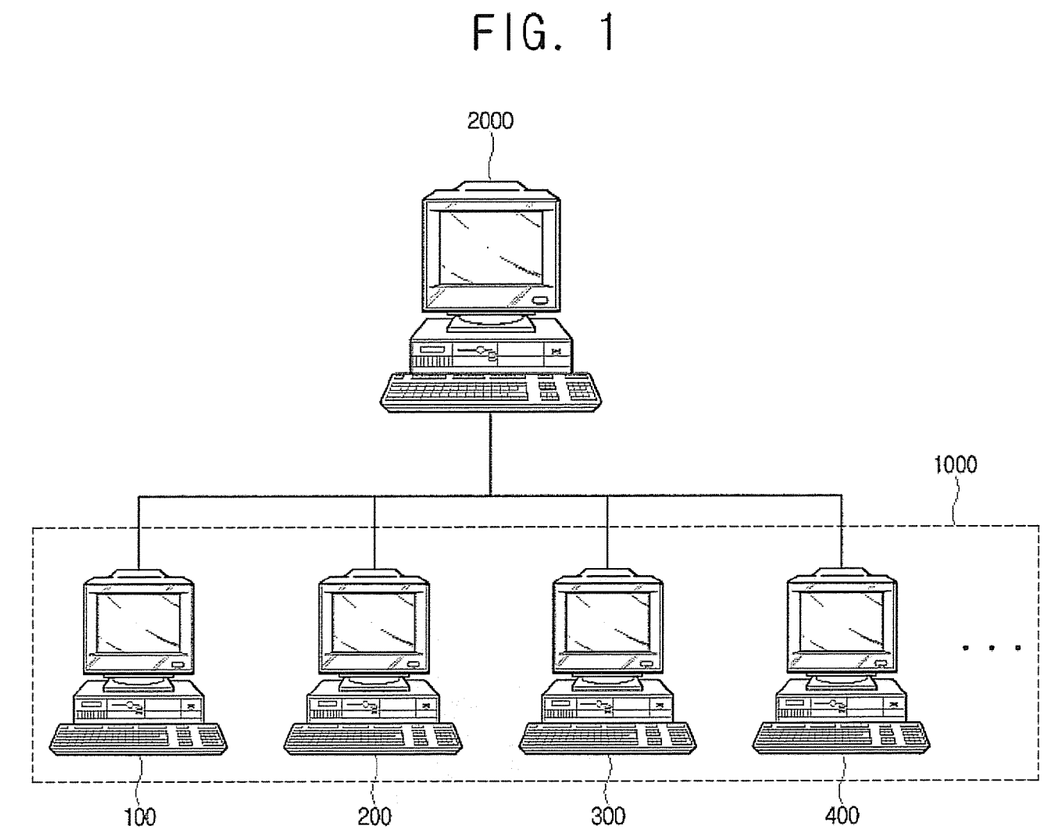
FIG. 1 is a drawing illustrating a remote control system according to an embodiment of the present invention.

In a remote control system, as shown in FIG. 1, a host computer 2000 is connected to a plurality 1000 of client computers 100-400 through a network using a local area network (LAN) or another suitable networking technology. As an example, the host computer 2000 controls the client computers 100-400 by using an Intel® Active Management Technology (AMT™). The host computer 2000 transmits a power on/off signal, a reset, an asset, and a remote power applying signal to control the client computers 100-400.

Figure 2:
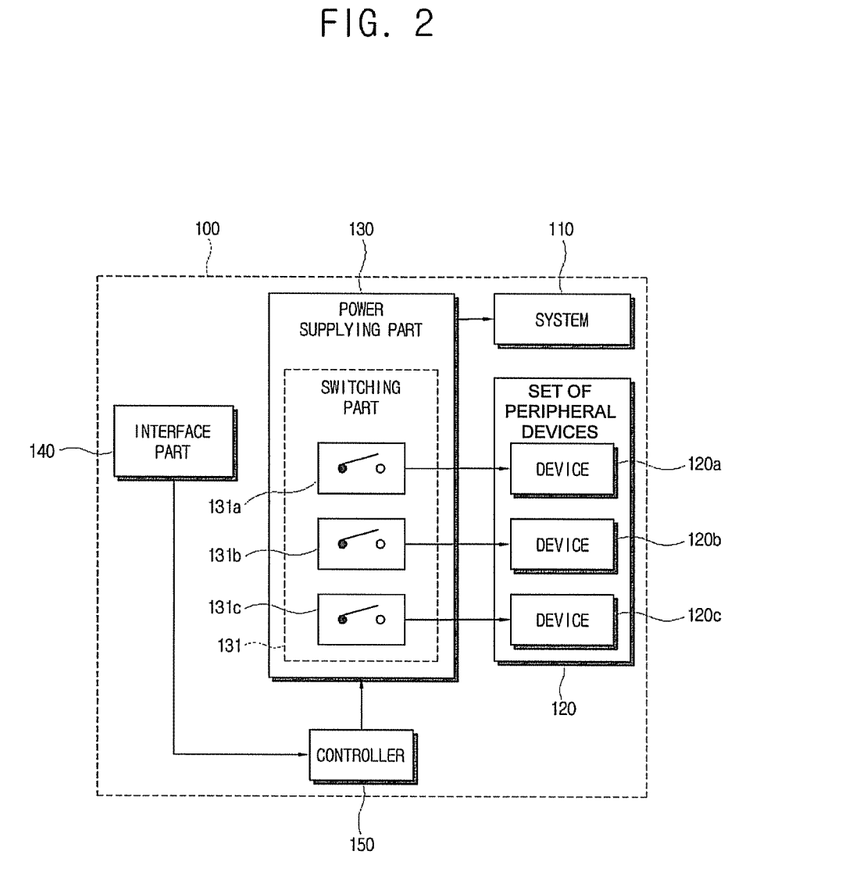
FIG. 2 is a control block diagram of a computer according to an embodiment of the present invention.

As shown in FIG. 2, a computer 100, of the client computers 100-400, comprises a system 110, a set of peripheral devices 120, a power supplying part 130, an interface part 140 and a controller 150. The system 110 is built into a main body of the computer 100 and performs operations according to applications of the computer 100. The system 110 may comprise hardware, software, and a Basic Input Output System (BIOS) to drive the computer 100.

The set of peripheral devices 120, includes peripheral devices 120a, 120b, and 120c, as shown in FIG. 2, that may run according to operations of an operating system (OS). The peripheral devices 120a, 120b, and 120c are each coupled to the main body of the computer 100. Each of the peripheral devices 120a, 120b, and 120c may comprise input/output devices such as a card mark reader, a mouse, a keyboard, a scanner, an Optical Disk Drive (ODD), a compact disk (CD), a DVD, a display unit, a printer, and a plotter operating according to the OS. The power supplying part 130 supplies power to the above-described system 110 and the set of peripheral devices 120 according to a power applying signal. According to an embodiment of the invention, the power supplying part 130 may comprise a switching part 131 that defines a path along which power is applied to the set of peripheral devices 120 from the power supplying part 130.

The switching part 131, according to an embodiment of the present invention, may comprise plural switches 131a, 131b, and 131c, as shown in FIG. 2, that operate on the power supplying path to connect the power supplying part 130 to the set of peripheral devices 120, including corresponding peripheral devices 120a, 120b, and 120c. That is, the switching part 131 comprises switches 131a, 131b, and 131c that respectively connect power applied to the respective peripheral devices 120a, 120b, and 120c from the power supplying part 130 by blocking the power applied to the peripheral devices 120a, 120b, and 120c that are not involved in particular operations according to a control of the controller 150.

The interface part 140 receives a command to drive the system 110 and the set of peripheral devices 120. The interface part 140 is provided as a communication part to remotely receive the command from the host computer 2000. The respective computers 100-400 may be connected with the host computer 2000 through a LAN (Local Area Network) as client computers 100-400.

The controller 150 controls the system 110 and the set of peripheral devices 120 to operate according to the command received directly or remotely. The computer 100 may be connected with the host computer 2000 and receives a power applying signal directly or remotely from the host computer 2000. The power applying signal may comprise a cold booting signal that applies power to the system 110 when the system 110 is in a power-off state.

The controller 150 receives the power applying signal from the host computer 2000 through the interface part 140. The power applying signal may be a command inputted according to an AMT control. Meanwhile, a booting operation of the client computers 100-400 can be performed by calling in the OS of the system 110 of the client computers 100-400 using a hard disk or a floppy disk as an auxiliary memory unit of a host computer 2000.

If a power applying signal is inputted, the controller 150 determines whether the inputted power applying signal is a power-saving signal. Here, in the remote control system according to an aspect of the present invention, the host computer 2000 performs a booting operation of the client computers 100-400 remotely, and the operation of the client computers 100-400 can be monitored in the host computer 2000.

Where the inputted power applying signal is a power-saving applying signal, the controller 150 applies the power to the system 110 and performs a basic input/output system (BIOS) operation to determine the function of the system 110, and controls the switching part 131 to prevent power from being applied to each of the peripheral devices 120a, 120b, and 120c of the set of the peripheral devices 120 in accordance with the power-saving applying signal.

The controller 150 controls the switching part 131 through a digital switching operation. For example, the controller 150 controls each switch 131a, 131b, and 131c of the switching part 131 to respectively prevent power from being applied to each of the peripheral devices 120a, 120b, and 120c of the set of the peripheral devices 120 of the client computers 100-400. The peripheral devices 120a, 120b, and 120c may include a monitor, a keyboard, a mouse, and an ODD. Here, the booting operation of the client computers 100-400 can be observed via the monitor of the host computer 2000.

Meanwhile, the host computer 2000, according to another embodiment of the present invention, may transmit the power-saving applying signal including selection information for selecting each of the peripheral devices 120a, 120b, and 120c to the client computers 1000 when booting. The selection information relates to the peripheral devices 120a, 120b, and 120c which will not be supplied with power.

The controller 150 applies the power to the system 110 and performs the BIOS operation if a remote power applying signal is inputted through the interface part 140. At this time, the controller 150 determines whether the inputted power applying signal is a power-saving applying signal. If the inputted power applying signal is determined to be a power-saving applying signal, the controller 150 controls the switches 131a, 131b, and 131c connected to the power paths of the respective peripheral devices 120a, 120b, and 120c to block power from being applied to the respective peripheral devices 120a, 120b, and 120c.

In addition, the controller 150 determines whether selection information is included in the power-saving applying signal. If selection information is included, the controller 150 will block power from being applied to the peripheral devices 120a, 120b, and 120c in accordance with the selection information. That is, if the selection information indicates that power should be blocked from being applied to the monitor and the keyboard of each of the client computers 100-400, then the monitors and the keyboards will be prevented from being powered up. That is, the controller 150 receives the power-saving applying signal and performs a booting operation to apply a first power to the system 110, and controls the monitors and the keyboards so that the power is not to be applied to these peripheral devices.

According to another embodiment of the invention, the selection information may indicate that different peripheral devices of each of the client computers 100-400 are to be powered differently. That is, the selection information may indicate that certain peripheral devices of client computers 100-400 are to have power applied thereto while others are not to have power applied thereto. In more detail, the selection information could, as an example, indicate that only the monitor of the client computer 100 is to be prevented from receiving power, that only the keyboard of client computer 200 is to be prevented from receiving power, that all of the peripheral devices of client computer 300 are to be powered, and that none of the peripheral devices of the client computer 400 are to be powered. Of course, it is understood that any combination of peripheral devices and client computers 100-400 are possible within the scope of this embodiment.

Hereinafter, an operation of the computer 100 connected with host computer 2000 through a network will be described by referring to the figures.

Figure 3:
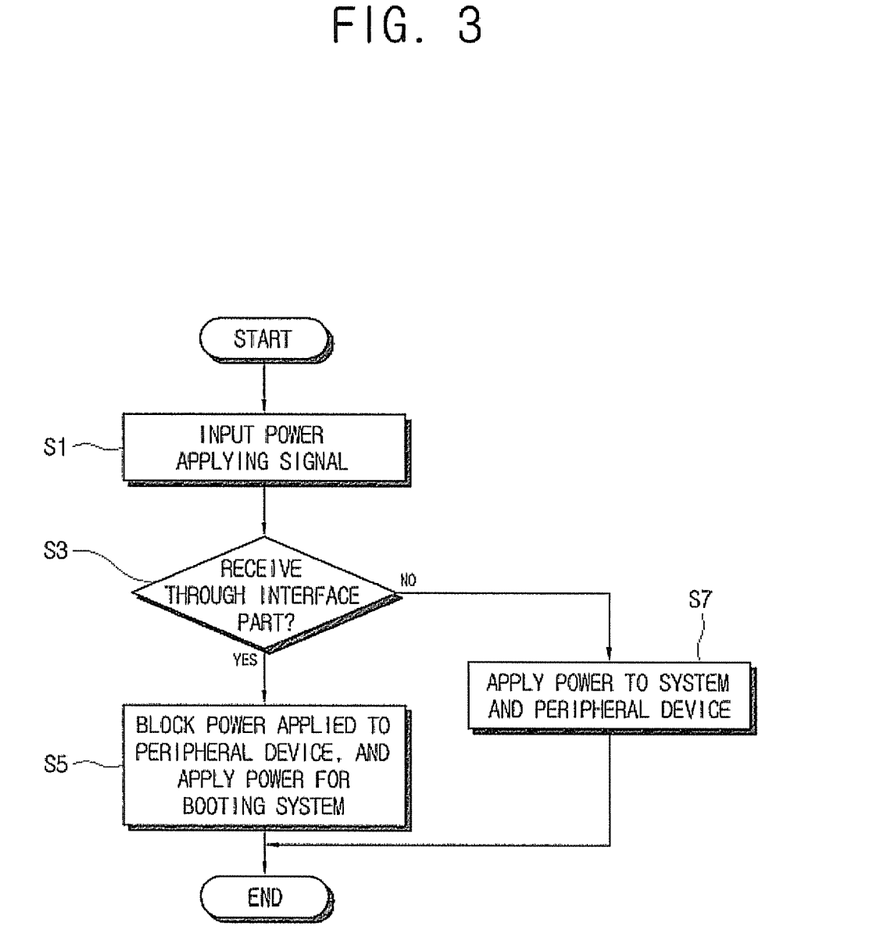
FIG. 3 is a flow diagram illustrating a power-saving booting operation of the computer according to an embodiment of the present invention.

FIG. 3 is a flow diagram illustrating an operation process of the computer 100 according to the remote power applying signal in the remote control system according to an embodiment of the present invention.

First, the power applying signal is inputted through the interface part 140 (S1). At this time, the controller 150 determines whether the inputted booting signal is a power-saving applying signal (S3). When the inputted booting signal is determined to be a power-saving applying signal transmitted from the host computer 2000, the controller 150 controls the switches 131a, 131b, and 131c of the switching part 131 to block the power path so that power is not applied to respective peripheral devices 120a, 120b, and 120c but rather to the system 110 (S5).

Meanwhile, if a general remote power applying signal is determined to be inputted in place of a power-saving applying signal in the S3 operation, the controller 150 applies power to the system 110 and the peripheral devices 120a, 120b, and 120c to perform a general booting operation (S7).

Figure 4:
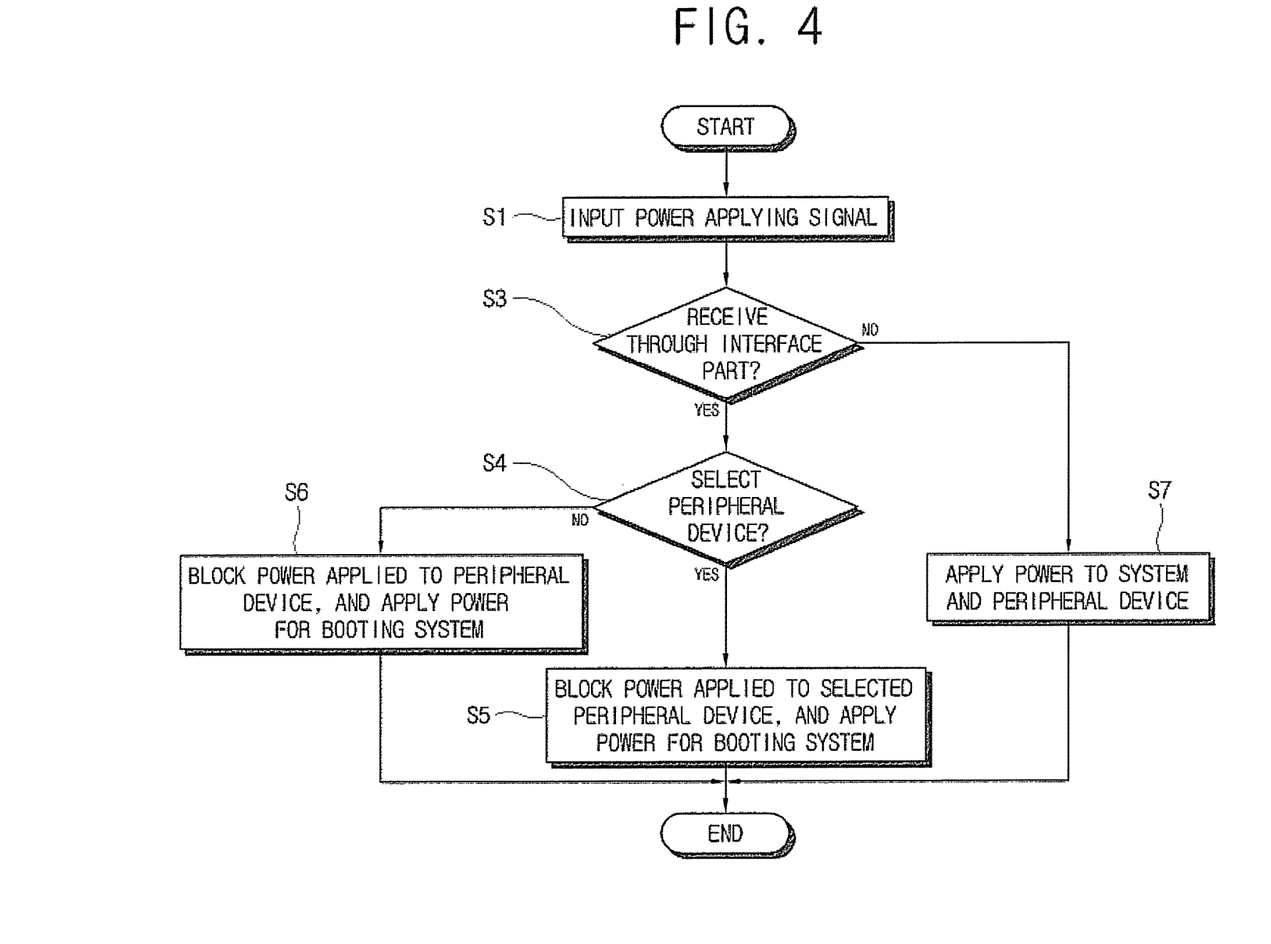
FIG. 4 is a flow diagram illustrating a power-saving booting operation of the computer according to another embodiment of the present invention.

Also, as shown in FIG. 4, if the power applying signal is inputted through the interface part 140 according to another embodiment of the present invention (S1), the controller 150 determines whether the inputted power applying signal is a power-saving applying signal (S3). When the inputted power applying signal is determined to be a power-saving applying signal, the controller 150 determines whether selection information exists that suggests that the power supply to certain ones of the peripheral devices 120a, 120b, and 120c should be blocked during the booting (S4).

If it is determined that selected ones of the peripheral devices 120a, 120b, and 120c should be blocked from receiving power, the controller 150 controls each respective switch 131a, 131b, and 131c corresponding to the selected peripheral devices 120a, 120b, and 120c to block the power applied to the selected peripheral devices 120a, 120b, and 120c. The controller 150 then applies power to the system 110 to perform a booting operation (S5).

Meanwhile, when there are no selected peripheral devices 120a, 120b, and 120c according to the result determined in S4, the controller 150 blocks the power applied to all of the peripheral devices 120a, 120b, and 120c and applies the power to the system 110 to thereby perform a booting operation (S6) according to the general power-saving applying signal. Also, when the power applying signal inputted through the interface part 140 is not the power-saving applying signal, the controller 150 performs the general booting operation (S7).

Of course it is understood that the method and equivalents thereof discussed above could be embodied as a computer readable medium having programs stored thereon to execute the method.

As is described above, according to aspects of the present invention, there is provided a computer, a computer control method, a remote control system and a remote control method capable of preventing power from being wasted unnecessarily by applying power only to the system and blocking power to peripheral devices when a host computer performs a remote power applying operation of client computers in a remote control system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer comprising:
a system operable to execute a Basic Input/Output System (BIOS);
a plurality of peripheral devices coupled to the system;
a power supplying part for supplying power to the system and the plurality of peripheral devices; and
an interface part for communicating with an external device,
wherein, if a first signal for booting is received via the interface part while the system and the plurality of peripheral devices are in a power off state, it is determined whether the first signal comprises a signal for a power-saving power applying mode or a signal for a general power applying mode, and when the first signal comprises the signal for the power-saving power applying mode, a booting of the system is executed such that power from the power supplying part is applied to the system and power from the power supplying part is not applied to one or more of the plurality of peripheral devices according to information, in the signal for the power-saving power applying mode, identifying the one or more of the plurality of peripheral devices, and when the first signal comprises the signal for the general power applying mode, the booting of the system is executed such that power from the power supplying part is applied to the system and power from the power supplying part is applied to one or more of the plurality of peripheral devices.

2. The computer according to claim 1, wherein the power supplying part comprises a switching part for defining paths along which power from the power supplying part is applied to the plurality of peripheral devices.

3. The computer according to claim 2, wherein a controller controls the switching part to prevent power from the power supplying part being applied to the one or more of the plurality of peripheral devices if the signal for the power-saving power applying mode is received through the interface part.

4. The computer according to claim 3, wherein the switching part comprises a switch that corresponds to the one or more of the peripheral devices.

5. The computer according to claim 4, wherein the controller controls the switch of the switching part to prevent the power from the power supplying part being applied to the one or more of the plurality of peripheral devices if the signal for the power-saving power applying mode is received through the interface part.

6. The computer according to claim 1, wherein the at least one of the plurality of peripheral devices comprise selected peripheral devices, identified according to the information in the signal for the power-saving power applying mode, that receive power from the power supplying part.

7. The computer according to claim 1, wherein the first signal includes a power-saving power applying signal comprising selection information to select that only selected peripheral devices are not to have power applied thereto when the power-saving power applying signal is received.

8. A remote control system, comprising:
a client computer comprising a system operable to execute a Basic Input/Output System (BIOS); and
a host computer, connected with the client computer through a network, for transmitting a first signal for booting to the client computer,
wherein the client computer and a plurality of peripheral devices coupled thereto are in a power off state when the first signal is received,
wherein the client computer determines whether the first signal comprises a signal for a power-saving power applying mode or a signal for a general power applying mode, and when the first signal comprises the signal for the power-saving power applying mode, executes a booting operation so that one or more of the plurality of peripheral devices do not receive power according to information, in the signal for the power-saving power applying mode, identifying the one or more of the plurality of peripheral devices, and when the first signal comprises the signal for the general power applying mode, executes the booting operation, so that one or more of the plurality of peripheral devices receives power,
wherein the host computer further transmits the signal for the power-saving power applying mode comprising information identifying one or more of the plurality of peripheral devices to have power applied thereto.

9. The remote control system according to claim 8, wherein the client computer prevents power from being applied to the one or more of the peripheral devices in accordance with the first signal.

10. The remote control system according to claim 8, wherein the first signal includes a power-saving power applying signal comprising selection information to select that only selected peripheral devices are not to have power applied thereto when the power-saving power applying signal is received.

11. A method of controlling a computer, the computer including a system operable to execute a Basic Input/Output System (BIOS) and a plurality of peripheral devices coupled to the computer, the method comprising:
determining whether a power applying signal for executing a booting operation of the system and applying power to the plurality of peripheral devices comprises a first signal for a power-saving power applying mode;
blocking power from being applied to one or more of the plurality of peripheral devices when the power applying signal is determined to comprise the first signal for the power-saving power applying mode; and
applying power to at least one of the plurality of peripheral devices to which no power is applied in association with the first signal for the power-saving power applying mode when the power applying signal is determined not to comprise the first signal for the power-saving power applying mode,
wherein the system and the plurality of peripheral devices are in a power off state when the power applying signal is received, and
wherein the determining comprises:
determining whether a second signal for the power-saving power applying mode comprising selection information for selecting power to be applied to the at least one of the peripheral devices is present within the first signal for the power-saving power applying mode; and
applying power to the at least one of the peripheral devices in accordance with the selection information if the second signal for the power-saving power applying mode is determined to be present.

12. The method according to claim 11, wherein the first signal includes a power-saving power applying signal comprising selection information to select that only selected peripheral devices are not to have power applied thereto when the power-saving power applying signal is received.

13. A method of remotely controlling a client computer, the client computer comprising a system operable to execute a Basic Input/Output System (BIOS) and a plurality of peripheral devices coupled to the client computer, via a host computer, the method comprising:
transmitting either a power applying signal or a first power-saving power applying signal to the client computer from the host computer;
determining whether the power applying signal or the first power-saving power applying signal is transmitted to the client computer, the power applying signal and the first power-saving power applying signal being for executing a booting operation;
preventing power from being applied to one or more of the plurality of peripheral devices coupled to the client computer when the first power-saving power applying signal is transmitted to the client computer;
applying power to at least one of the plurality of peripheral devices to which no power is applied in association with the power-saving power applying signal when the power applying signal is transmitted to the client computer;
if the first power-saving power applying signal is transmitted, generating selection information for selecting the at least one of the plurality of peripheral devices that receive power from a power supply when the host computer transmits the power applying signal to the client computer; and preventing power from being applied to the one or more of the peripheral devices according to the first power-saving power applying signal and the selection information, wherein the client computer and the plurality of peripheral devices are in a power off state when a signal comprising one of the power applying signal and the first power-saving power applying signal is transmitted, and wherein the power supply supplies power to the client computer and to the plurality of peripheral devices when required.

14. The method according to claim 13, wherein the first signal includes a power-saving power applying signal comprising selection information to select that only selected peripheral devices are not to have power applied thereto when the power-saving power applying signal is received.

15. A computer network including a host computer and a client computer, the client computer comprising:

a system operable to execute a Basic Input/Output System (BIOS) for conducting operations according to an operating system (OS);

a plurality of peripheral devices coupled to the system;

a power supplying part for supplying power to the system and the peripheral devices according to a type of a power supplying signal for executing a predetermined operation transmitted from the host computer;

a controller for determining the type of the power supplying signal; and a switching part for defining paths along which power is applied to the plurality of peripheral devices, wherein the controller controls the switching part to prevent power from being applied to a selected one or more of the plurality of peripheral devices if the type of the power supplying signal is determined to comprise a first power-saving power applying signal and apply power to at least one of the plurality of peripheral devices to which no power is applied in association with the power-saving power applying signal if the type of the power supplying signal is determined not to comprise the first power-saving power applying signal, wherein the client computer and the plurality of peripheral devices are in a power off state when the power supplying signal is transmitted, wherein the switching part prevents power from being applied to only the selected one or more of the plurality of peripheral devices when the power supplying signal is determined to comprise the first power-saving power applying signal including selection information that indicates that only the selected one or more of the plurality of peripheral devices are to be prevented from having power applied thereto, and wherein the power supplying part supplies power to the client computer and to the plurality of peripheral devices as required.

16. The computer network according to claim 15, further comprising an interface part for receiving the power supplying signal from the host computer.

17. The computer network according to claim 15, wherein there are a plurality of client computers.

18. The computer network according to claim 17, wherein each of the client computers includes a respective plurality of the peripheral devices.

19. The computer network according to claim 18, wherein switching parts of each of the client computers prevent power from being applied to the selected ones of the plurality of peripheral devices of each of the client computers when the type of the power supplying signal is determined to comprise the first power-saving power applying signal.

20. The computer network according to claim 18, wherein switching parts of each of the client computers prevent power from being applied to only the selected one or more of the plurality of peripheral devices of each of the client computers when the type of the power supplying signal is determined to comprise the first power-saving power applying signal including selection information that indicates that only the selected one or more of the plurality of peripheral devices are to be prevented from having power applied thereto.

21. The computer network according to claim 20, wherein the selected one or more of the plurality of peripheral devices comprise one or more of all of the peripheral devices of each of the client computers, corresponding peripheral devices of the client computers, differing peripheral devices of the client computers, or combinations thereof.

* * * * *